United States Patent
Miwa et al.

(10) Patent No.: US 9,763,015 B2
(45) Date of Patent: Sep. 12, 2017

(54) METHOD OF MANUFACTURING THERMOACOUSTIC ENERGY CONVERTING ELEMENT PART, THERMOACOUSTIC ENERGY CONVERTING ELEMENT PART, AND THERMOACOUSTIC ENERGY CONVERTER

(71) Applicant: NGK Insulators, Ltd., Nagoya-Shi (JP)

(72) Inventors: Shinichi Miwa, Gifu (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/641,785

(22) Filed: Mar. 9, 2015

(65) Prior Publication Data

US 2015/0281849 A1    Oct. 1, 2015

(30) Foreign Application Priority Data

Mar. 28, 2014    (JP) ................................ 2014-067960

(51) Int. Cl.
H04R 25/00    (2006.01)
H04R 23/00    (2006.01)
H04R 31/00    (2006.01)

(52) U.S. Cl.
CPC ........... H04R 23/002 (2013.01); H04R 31/00 (2013.01); *Y10T 29/4957* (2015.01)

(58) Field of Classification Search
CPC ...... H04R 23/002; H04R 23/00; H04R 31/00; H04R 1/403; F28D 17/00
USPC ................. 381/164, 140; 60/517, 527; 62/6; 73/646
See application file for complete search history.

(56) References Cited

U.S. PATENT DOCUMENTS

| | | | |
|---|---|---|---|
| 3,555,666 A | | 1/1971 | Rhee |
| 5,369,625 A | * | 11/1994 | Gabrielson ............ H04R 23/00 116/DIG. 19 |
| 2014/0140550 A1 | * | 5/2014 | Wei ........................ H04R 23/00 381/164 |

FOREIGN PATENT DOCUMENTS

| DE | 10 2011 086 776 A1 | | 5/2013 |
|---|---|---|---|
| FR | 296200 | * | 8/2011 |
| JP | 10-068556 A1 | | 3/1998 |
| JP | 2012-237295 A1 | | 12/2012 |

OTHER PUBLICATIONS

German Office Action (Application No. 10 2015 104 727.6) dated Feb. 22, 2017.

* cited by examiner

*Primary Examiner* — Davetta W Goins
*Assistant Examiner* — Phylesha Dabney
(74) *Attorney, Agent, or Firm* — Burr & Brown, PLLC

(57) ABSTRACT

To manufacture a thermoacoustic energy converting element part, a plurality of first plates and a plurality of second plates are formed. The first plate is provided with a plurality of linear penetration slits which are in parallel with each other and separated along a direction perpendicular to an extending direction of the slit. The slit penetrates the first plate in a thickness direction. The second plate is not provided with any penetration slit. A plate assembly is formed by layering some of the plurality of first plates between adjacent two of the plurality of second plates of which main surfaces face each other. The plate assembly is provided with a plurality of communicating passages formed with the penetration slits adjoining each other in a layering direction. Portions of the assembly at both ends in the extending direction of the penetration slits are cut off to open the communicating passages on both sides of the assembly.

20 Claims, 7 Drawing Sheets

METHOD OF MANUFACTURING THERMOACOUSTIC ENERGY CONVERTING ELEMENT PART, THERMOACOUSTIC ENERGY CONVERTING ELEMENT PART, AND THERMOACOUSTIC ENERGY CONVERTER

FIELD

The present invention relates to a method of manufacturing a thermoacoustic energy converting element part that converts acoustic energy into thermal energy or converts thermal energy into acoustic energy between the fluid in which acoustic waves travel and a wall in contact with the fluid, a thermoacoustic energy converting element part, and a thermoacoustic energy converter.

BACKGROUND

At present, from the viewpoint of conservation of the global environment, such technique is desired which can efficiently utilize the energy that used to be wasted. In particular, a technique that can convert wasted energy into mechanical energy is desired. For example, a Rankine bottoming cycle which generates steam to rotate a turbine, a Sterling cycle system using waste heat, a thermoelectric conversion system using a thermoelectric conversion element part, and a thermoacoustic system converting thermal energy into acoustic energy are known.

The thermoacoustic system uses a thermoacoustic conversion technique for exchanging energy between acoustic energy (hereinafter, also referred to as sound pressure energy) and thermal energy. The system uses a compression process and an expansion process in a fluid element of a fluid in which acoustic waves travel. Specifically, the technique uses the behavior of the compression process and the expansion process in the fluid element taking place at different locations (along the travelling direction of acoustic waves) for different longitudinal oscillations (acoustic waves).

Example thermoacoustic systems using the thermoacoustic conversion technique include a system with an apparatus having a sufficient contact area between a solid part and gas, where one end of the solid part is heated and a portion of heat is converted into acoustic energy which is supplied to the electric power generator. The key feature of the system is the temperature gradient in the solid part of the apparatus, though the efficiency of converting energy into acoustic wave energy is disadvantageously low. The disadvantage is due to an undesirable structure and property of the thermoacoustic energy converting element part configured to convert thermal energy into sound pressure energy.

As an example of the thermoacoustic energy converting element part used in the thermoacoustic system, a thermoacoustic stack is known that is made compact to generate self-excited oscillation even with high frequency under low temperature difference (JP 2012-237295A).

The thermoacoustic stack has a plurality of through holes formed through the process of bonding meshed metal plates that are previously layered. The stack is composed of a material having thermal conductivity below 10 W/m·K. For a shorter stack length, the temperature gradient can be scaled down (proportionally reduced) so that the temperature at a high temperature side heat exchanging unit, which is required to generate a critical temperature gradient, can be reduced.

By using the aforementioned stack, the required temperature for the high temperature side heat exchanging unit to achieve the critical temperature gradient can efficiently be reduced.

However at present, the efficiency of energy conversion between acoustic waves and heat is still low.

An object of the present invention is to provide a method of manufacturing a thermoacoustic energy converting element part that has a large contact area between a fluid and walls and can be provided with a large number of through holes, thereby providing efficient energy conversion between acoustic waves and heat between the fluid, through which acoustic waves travel, and the wall in contact with the fluid, and to provide a thermoacoustic energy converting element part and a thermoacoustic energy converter.

SUMMARY

There is provided with a method of manufacturing a thermoacoustic energy converting element part configured to convert acoustic energy into thermal energy or thermal energy into acoustic energy between a fluid in which acoustic waves travel and a wall in contact with the fluid, the method including:

forming a plurality of first plates and a plurality of second plates, the first plate being provided with a plurality of linear penetration slits penetrating the first plate in a thickness direction, the slits being provided in parallel with each other and at intervals in a direction perpendicular to an extending direction of the slit, the second plate being not provided with penetration slit;

forming a plate assembly by layering some of the plurality of first plates between adjacent two of the plurality of second plates of which main surfaces face each other, the plate assembly provided with a plurality of communicating passages therein, each of which is formed with the penetration slits adjoining each other in a layering direction; and cutting off portions of the assembly, after forming the assembly, at both ends in the extending direction of the penetration slits to open the communicating passages to cutaway surfaces on both sides of the assembly, for manufacturing a thermoacoustic energy converting element part provided with a plurality of through holes and walls surrounding the through holes and extending along the extending direction of the through holes.

It is preferable that the first plates and the second plates are metal plates, and the first plates and the second plates are bonded by thermocompression bonding.

The first plates and the second plates are preferably metal plates made of an identical material.

Preferably, a width of each penetration slit along a direction perpendicular to the extending direction of the penetration slits is 0.4 μm or smaller.

Preferably, a dimension of the communicating passage along the layering direction of the first plates is 0.4 μm or smaller.

Preferably, the method further includes forming a ceramic coating layer on an inner wall of the through hole.

There is also provided with a thermoacoustic energy converting element part that converts acoustic energy into thermal energy or thermal energy into acoustic energy between a fluid in which acoustic waves travel and a wall in contact with the fluid, the thermoacoustic energy converting element part including a wall extendingly surrounding each of the plurality of through holes provided as travelling routes of acoustic waves in a body of the thermoacoustic energy converting element part, the through holes linearly extending in a direction and the wall extending along an extending direction of the through holes, wherein the thermoacoustic energy converting element part is composed of a layered structure of a plurality of plates, each of the plates having a main surface parallel to an extending direction of the through holes.

In the thermoacoustic energy converting element part, when a parallel light is emitted into a first opening toward a second opening, a projection area of a parallel light passing out from the second opening is preferably 85% or more of the area of the first opening, the first opening and the second opening being located at both ends of each through hole.

Preferably, the through holes include a through hole having a hydraulic diameter of 0.4 mm or smaller.

Preferably, the plates include a bonded surface formed by thermocompression bonding of plates.

Preferably, the plurality of plates are metal plates of an identical type of metal.

Preferably, a ceramic coating layer is provided on an inner wall of the through hole.

There is also provided with a a thermoacoustic energy converter configured to amplify acoustic wave energy in fluid using heat of a wall in contact with the fluid, the thermoacoustic energy converter including:

a thermoacoustic energy converting element part that is configured to convert thermal energy into acoustic wave energy between a fluid in which acoustic waves travel and a wall in contact with the fluid, the thermoacoustic energy converting element part including a wall extendingly surrounding each of a plurality of through holes provided as travelling routes of acoustic waves in a body of the thermoacoustic energy converting element part, the through holes linearly extending in a direction and the wall extending along an extending direction of the through holes, and the thermoacoustic energy converting element part being composed of a layered structure of a plurality of plates each having a main surface parallel to the extending direction of the through holes;

a guide tube forming a travelling route of acoustic waves travelling in the fluid and configured to guide the acoustic waves to the through holes so as the acoustic waves travel along the extending direction of the through hole in the thermoacoustic energy converting element part; and a pair of heat exchanging units provided on both ends of the thermoacoustic energy converting element part and configured to generate temperature gradient along the extending direction between both ends of the thermoacoustic energy converting element part, wherein the guide tube includes an output end which is configured to output acoustic waves having sound pressure energy amplified by using the temperature gradient and to be coupled to a converter configured to convert the amplified sound pressure energy of output acoustic waves into other form of energy.

There is also provided with a thermoacoustic energy converter including a thermoacoustic energy converting element part configured to generate temperature gradient of a wall, using acoustic wave energy in a fluid, the wall being in contact with the fluid, the thermoacoustic energy converter including:

the thermoacoustic energy converting element part configured to convert acoustic wave energy into thermal energy between a fluid in which acoustic waves travel and a wall in contact with the fluid, the thermoacoustic energy converting element part including a wall extendingly surrounding each of a plurality of through holes provided as travelling routes of acoustic waves in a body of the thermoacoustic energy converting element part, the through holes linearly extending in a direction and the wall extending along an extending direction of the through holes, and the thermoacoustic energy converting element part being composed of a layered structure of a plurality of plates each having a main surface parallel to the extending direction of the through hole;

a guide tube forming a travelling route of acoustic waves travelling in the fluid and configured to guide the acoustic waves to the through holes so as the acoustic waves travel along the extending direction of the through holes in the thermoacoustic energy converting element part;

a heat exchanging unit provided on one of ends of the thermoacoustic energy converting element part and kept at a constant temperature; and a heat output unit provided on the other end of the thermoacoustic energy converting element part and configured to provide, by using a temperature gradient generated in the thermoacoustic energy converting element part by travelling of the acoustic waves, a temperature different from the temperature of the heat exchanging unit.

The thermoacoustic energy converting element part and the thermoacoustic energy converter have a large contact area between the fluid and the wall and can be provided with a large number of through holes, thereby performing efficient energy conversion between acoustic waves and heat between the fluid in which acoustic waves travel and the wall in contact with the fluid. Furthermore, by using the method of manufacturing the thermoacoustic energy converting element part, the irregularity of through holes along the extending direction in the thermoacoustic energy converting element part can be minimized, thereby forming precisely straight through holes.

DETAILED DESCRIPTION

As described above, the efficiency of energy conversion between acoustic waves and heat of thermoacoustic systems available at present is still low. Therefore, the improvement in efficiency of energy conversion between acoustic waves in a fluid and a heat of a wall in contact with the fluid is strongly desired. To further improve the efficiency of energy conversion between acoustic waves and heat, preferably, measures are to be taken, that is, reducing thermal conductivity of the wall along the through hole so that the temperature gradient along the through hole in the wall can be maintained, increasing the contact area for converting energy between the fluid and the walls of through holes in which acoustic waves travel, and providing a large number of through holes that are formed linear and parallel to each other, thereby avoiding disturbance to the travelling of acoustic waves. However, since the aforementioned thermoacoustic stack is composed by bonding the previously layered metal mesh plates, the walls of the through holes have irregularity along the extending direction of through holes, which causes difficulty to form through holes that are linear and parallel to each other. Considering the measures, a method of manufacturing a thermoacoustic energy converting element part, a thermoacoustic energy converting element part, and a thermoacoustic energy converter can be obtained as described below.

A method of manufacturing a thermoacoustic energy converting element part, a thermoacoustic energy converting element part, and a thermoacoustic energy converter will be described in detail.

Thermoacoustic Energy Converter 10

Figure 1:
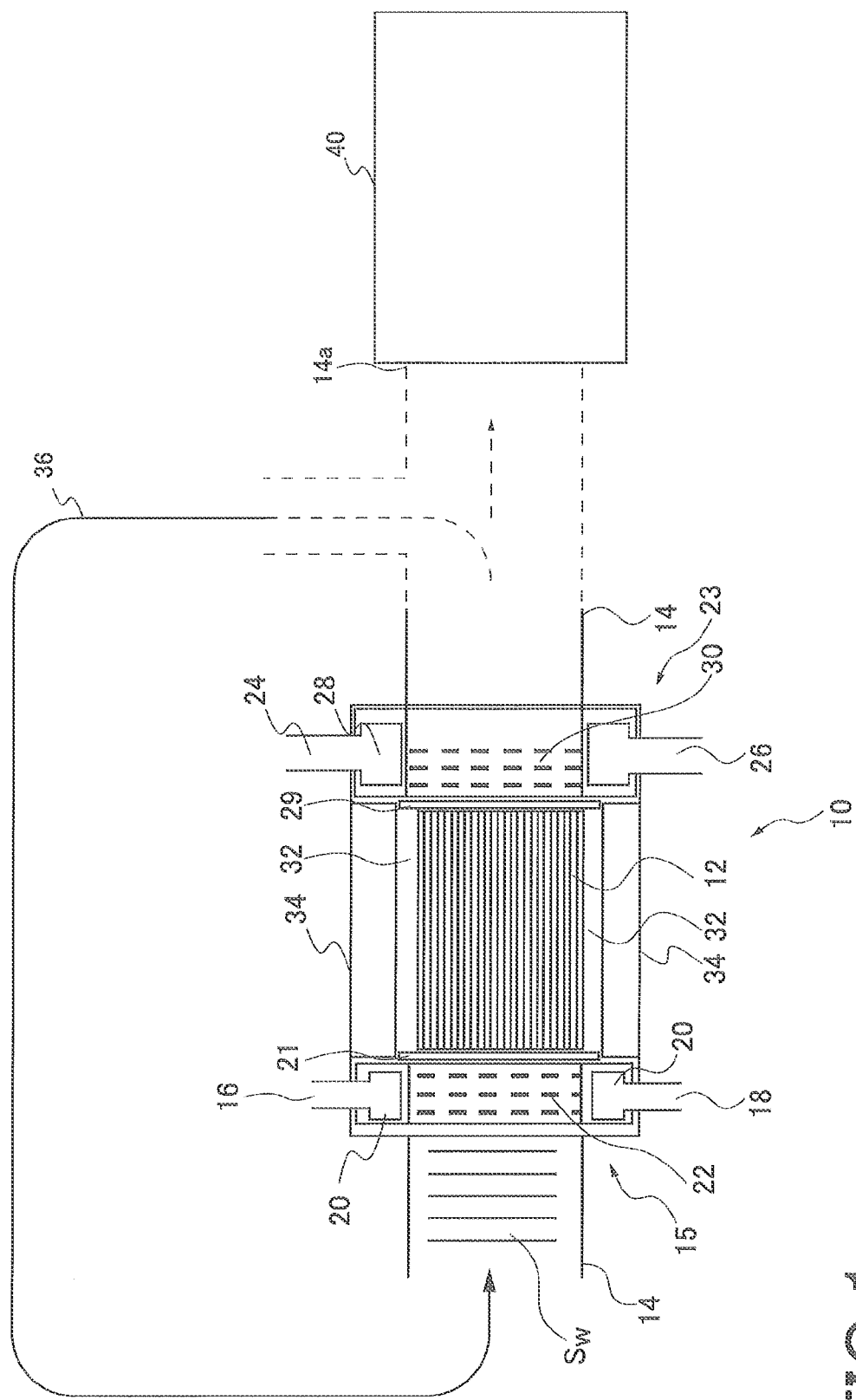
FIG. 1 illustrates an example configuration of a thermoacoustic energy converter according to an embodiment in which a thermoacoustic energy converting element part according to the embodiment is used.

FIG. 1 illustrates an example configuration of a thermoacoustic energy converter 10 according to an embodiment in which a thermoacoustic energy converting element part according to the embodiment is used. The thermoacoustic energy converter 10 illustrated in FIG. 1 is an apparatus configured to amplify the sound pressure energy of acoustic waves travelling in a guide tube and to covey the amplified sound pressure energy to a converting unit 40 that converts the amplified sound pressure energy into other form of energy. The converting unit 40 may be, for example, an electric power generator configured to convert sound pressure energy into electrical energy or an apparatus configured to convert sound pressure energy into thermal energy. The generator generates electromagnetic induction to produce electromotive force by oscillating a coil or a magnet, or a power generating element, by acoustic waves. The converting unit that converts sound pressure energy into thermal energy is used, for example, as a cooling device that cools a cooling medium by converting sound pressure energy into thermal energy.

The thermoacoustic energy converter 10 is an apparatus that amplifies the sound pressure energy of an entering acoustic wave Sw in the thermoacoustic energy converting element part and outputs the resulting acoustic wave having amplified sound pressure energy. The thermoacoustic energy converter 10 can output acoustic waves having significantly large sound pressure energy by, for example, amplifying the small sound pressure energy of the acoustic wave Sw in the thermoacoustic energy converting element part and repeating this amplification by circulating and inputting the acoustic waves having amplified sound pressure energy to the thermoacoustic energy converting element part. In an initial stage where the acoustic wave Sw having small sound pressure energy is generated, the thermoacoustic energy converter 10 selectively amplifies a portion of noises in the sound in the guide tube 14 that has a frequency determined by the shape and dimensions of the thermoacoustic energy converter 10. The acoustic wave Sw having small sound pressure energy is generated by self-oscillation.

As illustrated in FIG. 1, the thermoacoustic energy converter 10 includes a thermoacoustic energy converting element part 12, the guide tube 14, and heat exchanging units 15 and 23 as main parts.

The thermoacoustic energy converting element part 12 converts energy between acoustic waves and heat between the fluid, in which acoustic waves Sw travel, and the wall in contact with the fluid. The thermoacoustic energy converting element part 12 is provided with a plurality of tubular through holes extending in a direction to form travelling routes of the acoustic waves Sw as will be described below. The thermoacoustic energy converting element part 12 has a body formed in a pillar shape, such as a column or a square pillar, and provided with a large number of through holes extending along the axis of the pillar so as to be in parallel to each other. The thermoacoustic energy converting element part 12 is made of, for example, metals or ceramics.

The guide tube 14 contains a fluid and forms a travelling route of the acoustic wave Sw travelling in the fluid. The guide tube 14 guides the acoustic wave Sw to the through hole so that the acoustic wave Sw travels along the extending direction of the through holes in the thermoacoustic energy converting element part 12. The guide tube 14 is, for example, a metal tube. As for the fluid contained in the guide tube 14, gases are preferably used, for example, hydrogen gas or helium gas. The gas is hermetically contained in the guide tube 14 and controlled to a certain pressure of, for example, a few atmospheres to a few tens of atmospheres. As illustrated in dashed lines in FIG. 1, the guide tube 14 forms a circulation path 36 in which the acoustic wave Sw circulates through the thermoacoustic energy converting element part 12. The guide tube 14 includes an output end 14a coupled to a converting unit 40 that converts the amplified sound pressure energy in the acoustic wave Sw into another form of energy other than sound pressure energy. Although the guide tube 14 forms the circulation path 36 in the embodiment, the guide tube 14 may not form a circulation path.

The heat exchanging unit 15 is a low temperature portion provided to one of ends of the thermoacoustic energy converting element part 12 to keep the end of the thermoacoustic energy converting element part 12 at a low temperature. Hereinafter, the heat exchanging unit 15 is referred to as, with the same reference sign, low temperature portion 15. The heat exchanging unit 23 is a high temperature portion provided to the other end of the thermoacoustic energy converting element part 12 to keep the other end of the thermoacoustic energy converting element part 12 at a high temperature. Hereinafter, the heat exchanging unit 23 is referred to as, with the same reference sign, high temperature portion 23. With the low temperature portion 15 and the high temperature portion 23, a temperature gradient is generated between both the ends of the thermoacoustic energy converting element part 12 along the wall of the through hole provided in the thermoacoustic energy converting element part 12, that is, along the extending direction of the through holes.

The low temperature portion 15 includes a supply tube 16 for supplying a low temperature medium such as gas or liquid to the low temperature portion 15, an ejection tube 18 for ejecting the medium from the low temperature portion 15, and an annular tube 20 provided between the supply tube 16 and the ejection tube 18 to annularly surround the travelling route of the acoustic wave Sw. The supply tube 16 is coupled to a cold source (not illustrated). The annular tube 20 is coupled to the supply tube 16 and the ejection tube 18. The annular tube 20 is in contact with a metal member 21 having high thermal conductivity. The metal member 21 is in contact with the thermoacoustic energy converting element part 12. The heat exchanged at the end of the thermoacoustic energy converting element part 12 via the metal member 21 flows from the end of the thermoacoustic energy converting element part 12 to the low temperature portion 15. In this manner, the end of the thermoacoustic energy converting element part 12 in contact with the metal member 21 is cooled. The low temperature portion 15 has a cooling fin 22 to cool the fluid contained in the guide tube 14. The cooling fin 22 coupled to the annular tube 20 absorbs heat from the fluid at the low temperature portion 15 to reduce the temperature of the fluid.

The high temperature portion 23 includes a supply tube 24 for supplying a high temperature medium such as gas or liquid to the high temperature portion 23, an ejection tube 26 for ejecting the medium from the high temperature portion 23, and an annular tube 28 provided between the supply tube 24 and the ejection tube 26 to annularly surround the travelling route of the acoustic wave Sw. The supply tube 24 is coupled to a hot source (not illustrated). The annular tube 28 is coupled to the supply tube 24 and the ejection tube 26. The annular tube 28 is in contact with a metal member 29 having high thermal conductivity. The metal member 29 is in contact with the thermoacoustic energy converting element part 12. The heat is exchanged between the end of the thermoacoustic energy converting element part 12 and the high temperature portion 23 via the metal member 29, and the end of the thermoacoustic energy converting element part 12 is heated with heat flowing from the high temperature portion 23. The high temperature portion 23 has a heating fin 30 to heat the fluid contained in the guide tube 14. The heating fin 30 coupled to the annular tube 28 supplies heat to the fluid at the high temperature portion 23 to raise the temperature of the fluid at the heating fin 30.

An insulation member 32 is provided on the outer periphery of the thermoacoustic energy converting element part 12 to suppress heat transfer of the thermoacoustic energy converting element part 12. A casing 34 is provided on the outer periphery of the insulation member 32 with a gap between the casing 34 and the insulation member 32.

The thermoacoustic energy converting element part 12 can thus keep the temperature gradient generated by the low temperature portion 15 and the high temperature portion 23. The effect of the thermoacoustic energy converting element part 12 of the thermoacoustic energy converter 10 will be described below.

Thermoacoustic Energy Converter 110

Figure 2:
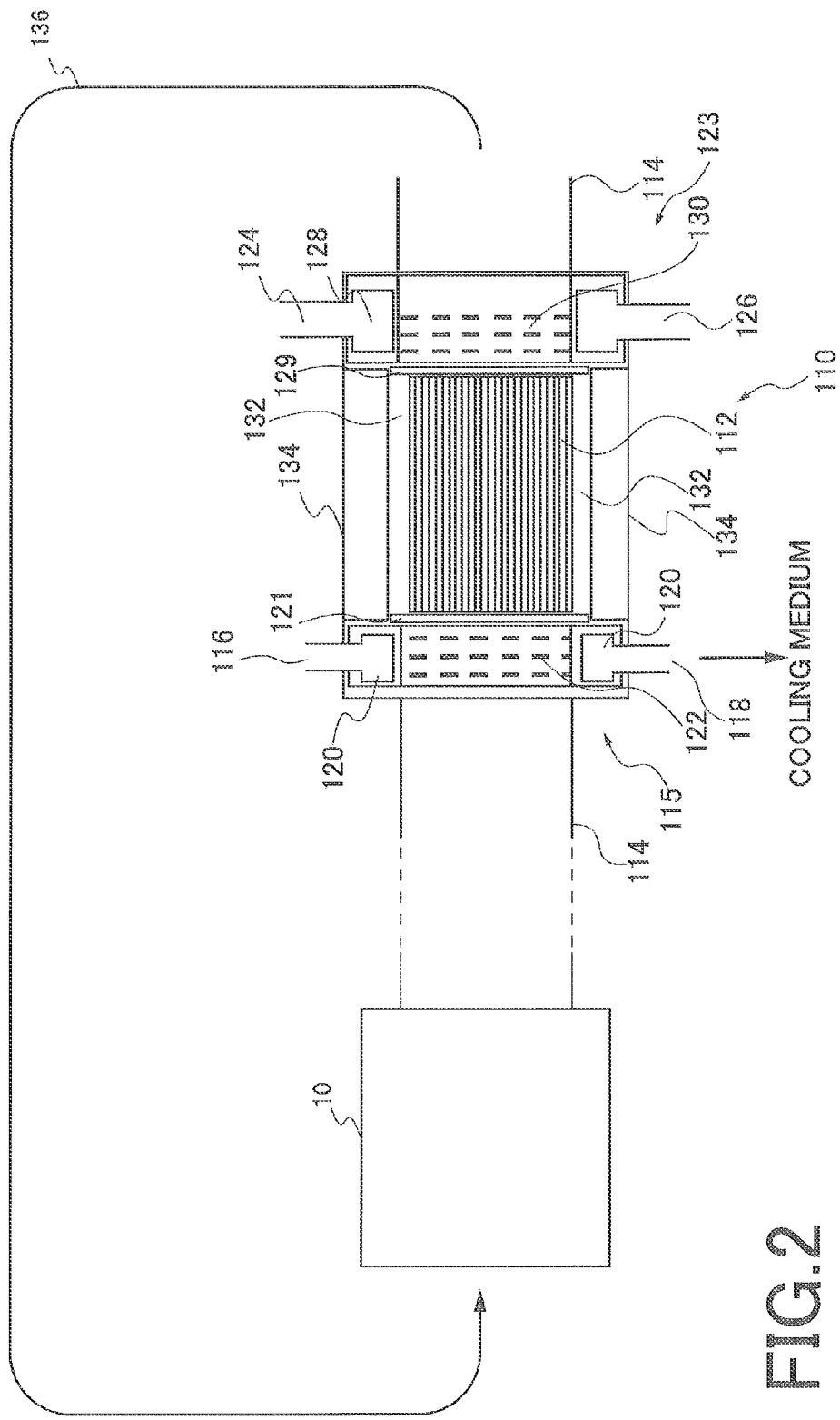
FIG. 2 illustrates an example configuration of a thermoacoustic energy converter according to another embodiment different from the thermoacoustic energy converter illustrated in FIG. 1.

FIG. 2 illustrates an example configuration of a thermoacoustic energy converter 110 according to another embodiment different from the thermoacoustic energy converter 10. The thermoacoustic energy converter 110 illustrated in FIG. 2 is an apparatus configured to convert sound pressure energy of acoustic waves travelling in the guide tube into thermal energy.

As illustrated in FIG. 2, the thermoacoustic energy converter 110 includes a thermoacoustic energy converting element part 112, a guide tube 114, a heat exchanging unit 123, and a heat output unit 115 as main parts. The heat output unit 115 provides a temperature different from that of the heat exchanging unit 123, in other words, the heat output unit 115 outputs a cooled medium (gas or liquid) for cooling.

The thermoacoustic energy converter 110 is coupled, via the guide tube 114, to the thermoacoustic energy converter 10 which outputs acoustic waves. The thermoacoustic energy converter 110 according to the embodiment is coupled to the thermoacoustic energy converter 10, although the thermoacoustic energy converter 110 may be coupled to other devices that generate acoustic waves.

The guide tube 114 and the heat exchanging unit 123 have the configuration identical to the guide tube 14 and the heat exchanging unit 23, respectively, which are illustrated in FIG. 1.

The guide tube 114 contains a fluid and forms a travelling route of acoustic waves travelling in the fluid. The guide tube 114 guides the acoustic waves to the through hole in the thermoacoustic energy converting element part 112 so that the acoustic waves travel along the extending direction of the through holes. The guide tube 114 is, for example, a metal tube. As for the fluid contained in the guide tube 114, gases are used, for example, hydrogen gas or helium gas. The gas is hermetically contained in the guide tube 114 and controlled to a certain pressure of, for example, a few atmospheres to a few tens of atmospheres. As illustrated in FIG. 2, the guide tube 114 forms a circulation path 136 in which acoustic waves circulate through the thermoacoustic energy converting element part 112. Although the guide tube 114 forms the circulation path 136 in the embodiment, the guide tube 114 may not form a circulation path.

The heat exchanging unit 123 includes a supply tube 124 for supplying a constant-temperature medium such as gas or liquid to the heat exchanging unit 123, an ejection tube 126 for ejecting the medium from the heat exchanging unit 123, and an annular tube 128 provided between the supply tube 124 and the ejection tube 126 to annularly surround the travelling route of the acoustic waves. The supply tube 124 is coupled to a heat source kept at a certain temperature (not illustrated). The annular tube 128 is coupled to the supply tube 124 and the ejection tube 126. The annular tube 128 is in contact with a metal member 129 having high thermal conductivity. The metal member 129 is in contact with the thermoacoustic energy converting element part 112. Heat is exchanged, via the metal member 129, between one end of the thermoacoustic energy converting element part 112 and the heat exchanging unit 123, and the temperature at the end of the thermoacoustic energy converting element part 112 becomes identical to the temperature of the heat exchanging unit 123. The heat exchanging unit 123 has a fin 130 to keep the fluid contained in the guide tube 114 at a certain temperature. The fin 130 coupled to the annular tube 128 supplies heat to the fluid at the heat exchanging unit 123 to keep the fluid at the fin 130 at a certain temperature.

An insulation member 132 is provided on the outer periphery of the thermoacoustic energy converting element part 112 to suppress heat transfer from the thermoacoustic energy converting element part 112. A casing 134 is provided on the outer periphery of the insulation member 132 with a gap in between. The thermoacoustic energy converting element part 112 can thus keep the temperature gradient generated by acoustic waves. The effect of the thermoacoustic energy converting element part 112, which performs conversions between acoustic waves and heat, of the thermoacoustic energy converter 110 will be described below.

The heat output unit 115 is provided at one of ends of the thermoacoustic energy converting element part 112. By using the temperature gradient generated in the thermoacoustic energy converting element part 112 by the travelling acoustic waves, the heat output unit 115 provides a temperature different from that of the heat exchanging unit 123. The temperature gradient is formed between the heat output unit 115 and the heat exchanging unit 123 which is kept at a certain temperature.

The heat output unit 115 includes a supply tube 116 for supplying a medium such as gas or liquid, an ejection tube 118 for ejecting the medium from the heat output unit 115, and an annular tube 120 provided between the supply tube 116 and the ejection tube 118 to annularly surround the travelling route of acoustic waves. The annular tube 120 is coupled to the supply tube 116 and the ejection tube 118. The annular tube 120 is in contact with a metal member 121 having high thermal conductivity. The metal member 121 is in contact with the thermoacoustic energy converting element part 112. The annular tube 120 exchanges heat with an end of the thermoacoustic energy converting element part 112 via the metal member 121, and the heat flows from the heat output unit 115 to the end of the thermoacoustic energy converting element part 112, thereby cooling the annular tube 120. The medium flowing in the annular tube 120 is output as a cooing medium. The cooling medium is used in devices for cooling. The heat output unit 115 has a cooling fin 122 to cool the fluid contained in the guide tube 114. The cooling fin 122 coupled to the annular tube 120 absorbs heat in the fluid at the heat output unit 115 to reduce the temperature of the fluid.

In the thermoacoustic energy converter 110, the thermoacoustic energy converting element part 112 converts the sound pressure energy of acoustic waves into thermal energy. The effect of the thermoacoustic energy converting element part 12 and the thermoacoustic energy converting element part 112, that is, the conversion between sound pressure energy and thermal energy will be described below.

Thermoacoustic Energy Converting Element Part

Figure 3:
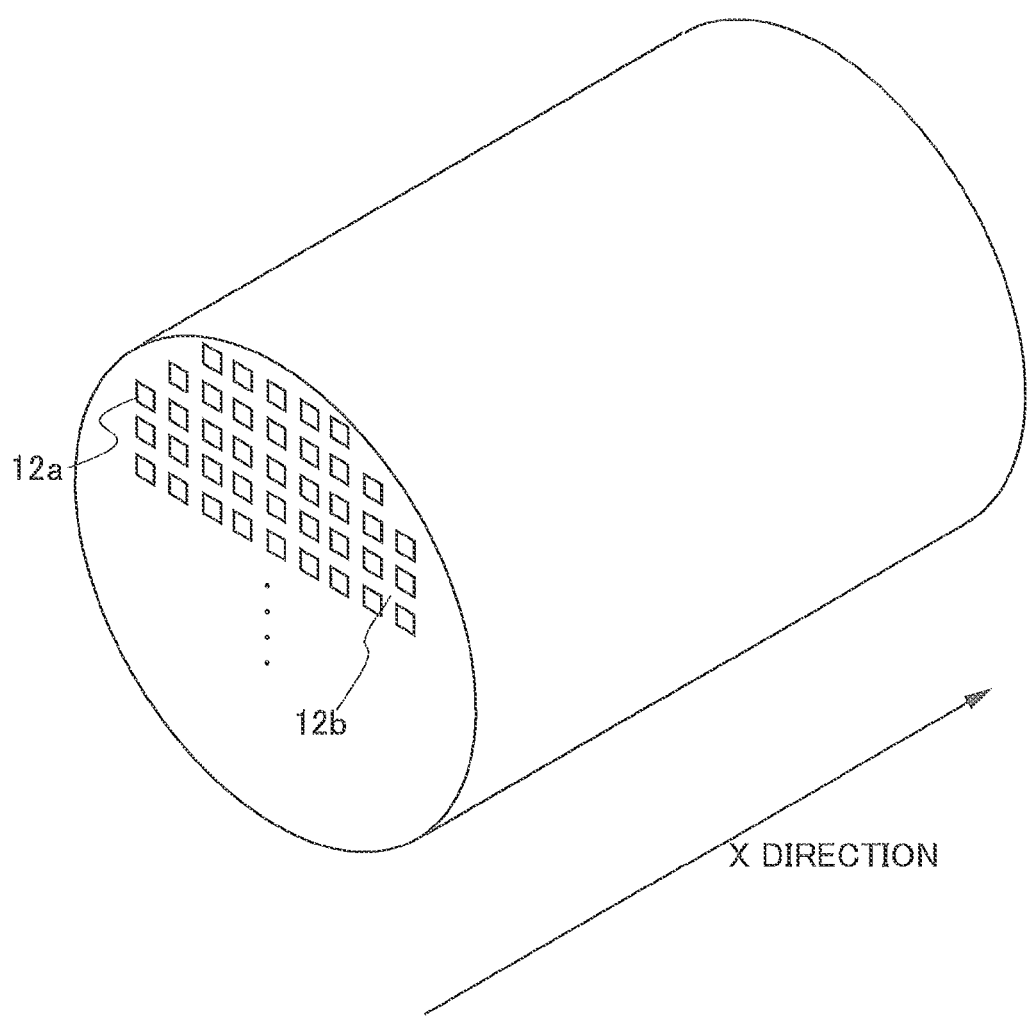
FIG. 3 is an external perspective view of an example thermoacoustic energy converting element part according to the embodiment.

Since the thermoacoustic energy converting element part 12 and the thermoacoustic energy converting element part 112 have the identical configuration, the thermoacoustic energy converting element part 12 will representatively be described. FIG. 3 is an external perspective view of the thermoacoustic energy converting element part 12.

The thermoacoustic energy converting element part 12 is provided with a plurality of through holes 12a extending along a direction to penetrate a body of the thermoacoustic energy converting element part 12 to form traveling routes of acoustic waves. The thermoacoustic energy converting element part 12 has a wall 12b surrounding each of the plurality of through holes 12a and extending along the extending direction of the through hole 12a (along X direction in FIG. 3). The wall 12b exchanges heat with a fluid as will be described later.

The length of the thermoacoustic energy converting element part 12 in X direction is determined according to a wavelength of acoustic waves generated in the guide tube 14 or a longitudinal oscillatory displacement of fluid. For example, the length is preferably 10 mm or longer and shorter than 500 mm. If the length is within this range, the length is identical to the displacement of the longitudinal oscillation of a fluid element generated by acoustic waves, and energy conversion can be performed efficiently.

Figure 4A:
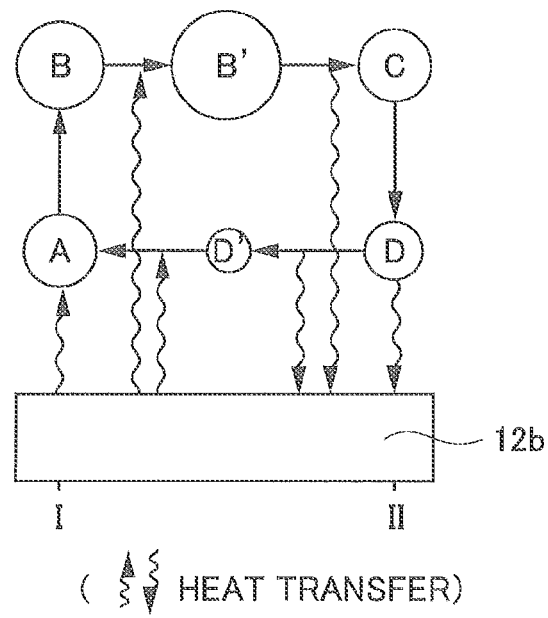
FIGS. 4A and 4B explain conversion between sound pressure energy and thermal energy in the thermoacoustic energy converting element part.
Figure 4B:
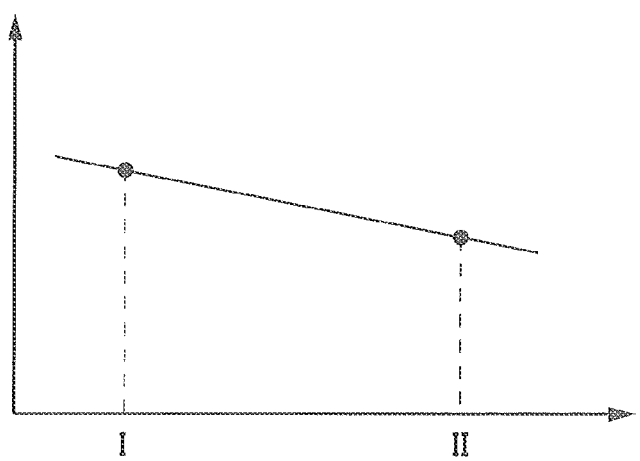

FIGS. 4A and 4B explain conversion between sound pressure energy and thermal energy performed in the thermoacoustic energy converting element part 12.

The fluid is a medium that causes acoustic waves to travel and longitudinally oscillates. The relation between the displacement of the fluid and compression as well as expansion of the fluid caused by the longitudinal oscillation will be explained for a fluid element which is a very small portion of the fluid.

If the acoustic wave is a travelling wave, the fluid element is incessantly subject to compression and expansion as acoustic waves travel in the fluid. The location of the fluid element along the wall 12b in X direction is different for compression and expansion, that is, the location changes as the fluid longitudinally oscillates.

FIG. 4A illustrates one cycle of compression and expansion of the travelling wave that has a phase difference of a quarter of the cycle period between the sound pressure of the acoustic waves and the displacement of the fluid element. In advance, one of ends of the wall 12b (at location I) is externally heated and the other end of the wall 12b (at location II) is externally cooled to generate a temperature gradient in the wall 12b as illustrated in FIG. 4B. In FIG. 4B, the horizontal axis represents location in the wall 12b and the vertical axis represents the temperature of the wall 12b. The fluid element at the location I along the wall 12b is under the expansion process, that is, under state A. The fluid element continues the expansion to become state B. During the process, the fluid element receives heat from the high-temperature wall 12b. The fluid element under the state B then starts to move toward the location II along the wall 12b and becomes the most expanded state B'. Under the state B', the fluid element starts compression and becomes state D. During the process, the fluid element supplies heat to the low-temperature wall 12b. The fluid element under the state D then starts to move toward the location I and becomes the most compressed state D'. During the process, the fluid element supplies heat to the wall 12b. As the fluid element receives heat from the wall 12b during the expansion process and the wall 12b takes out heat from the fluid element during the compression process, compression and expansion of the fluid element can be enhanced. By generating the temperature gradient, in advance, in the thermoacoustic energy converting element part 12, the sound pressure energy of the acoustic waves travelling through the thermoacoustic energy converting element part 12 can be amplified.

In contrast, when no temperature gradient is generated on the wall 12b, the heat is supplied from the fluid element, which raises its temperature during the compression process, to the wall 12b and the fluid element takes out heat from the wall 12b during the expansion process, which result in generation of a temperature gradient opposite to that in FIG. 4B, in the wall 12b. The thermoacoustic energy converting element part 112 can provide a low temperature or a high temperature using the temperature gradient generated by the sound pressure energy of the acoustic waves travelling through the thermoacoustic energy converting element part 112. For example, the temperature gradient is generated between the location I and the location II along the wall 12b by the acoustic waves. If one of the location I and the location II is controlled to be at a constant temperature, the temperature gradient can provide a temperature, different from the constant temperature, at the other location. The thermoacoustic energy converting element part 112 can provide a low temperature or a high temperature using the temperature gradient generated by the sound pressure energy of the acoustic waves travelling through the thermoacoustic energy converting element part 112.

The circulation paths 36 and 136 are preferably formed so that the cycle can be repeated several times, where the aforementioned cycle is determined as one cycle.

The above description is representatively made for the travelling wave. As for the travelling wave, there is a phase difference of a quarter of the cycle period between the compression and expansion cycle of the fluid and the displacement cycle of the fluid element. The energy conversion between acoustic waves and heat is thus performed. In contrast, as for the standing wave, there is no phase difference between the cycle of compression and expansion of the fluid and the cycle of displacement of the fluid element, so that energy conversion is not likely to take place. As for the standing wave, however, by determining the frequency of acoustic waves considering a delay in energy conversion between the fluid and the wall, the conversion can be performed. The wavelength of the standing wave is determined by the length of the guide tubes 14 and 114 or the circulation paths 36 and 136, and the wavelength determines the frequency of the acoustic wave. That is, the frequency of the acoustic wave can be controlled by adjusting the length of the guide tubes 14 and 114 or the circulation paths 36 and 136. The delay in energy conversion is determined by thermal conductivity, density, and specific heat at constant pressure of the fluid and the size of the through hole.

To make the thermoacoustic energy converting element part 12 and the thermoacoustic energy converting element part 112 function efficiently, the energy conversion between acoustic waves and heat is preferably performed at several locations. Furthermore, to prevent damping of sound pressure energy due to friction between acoustic waves and the wall 12b, the through holes 12a are preferably extending straight, that is, the walls 12b forming the through holes 12b are preferably extending straight along the extending direction of the through holes 12b without irregularity.

The thermoacoustic energy converting element part 12 and the thermoacoustic energy converting element part 112 are configured with an assembly composed of a plurality of plates each having a main surface parallel to the extending direction of the through hole 12a so as to form the through holes 12a extending straight. From the assembly composed of a plurality of plates, the thermoacoustic energy converting element part 12 and the thermoacoustic energy converting element part 112 provided with a large number of through holes 12a extending straight can easily be manufactured.

Specifically, the thermoacoustic energy converting element part 12 and the thermoacoustic energy converting element part 112 provided with a plurality of through holes 12a can be manufactured by layering a plurality of plates having penetration slits (through holes), each linearly extending along a direction parallel to the main surface of the plate and penetrating the plate in the thickness direction. A plurality of plates provided with linear penetration slits can be precisely formed with accurate dimensions by etching the plates with no slit, as will be described later. Consequently, in the thermoacoustic energy converting element part 12, the degree of straightness of the inner walls of through holes 12a (hereinafter referred to as straightness of the through holes 12a) can be improved, and the irregularity of the inner walls of through holes 12a, which hinders the travelling of acoustic waves in the through holes 12a, is reduced compared to a conventional art. The damping of sound pressure energy is thus minimized, and the energy conversion efficiency between acoustic waves and heat in the thermoacoustic energy converting element part 12 can be improved.

The straightness of the through hole 12a can be estimated by, for example, emitting a parallel light (e.g., a laser beam) into the through hole 12a from a first opening toward a second opening and measuring the projection area of the parallel light passing out from the second opening. The first opening and the second opening are at both ends of the through hole 12a. Specifically, the straightness of the through hole 12a can be estimated from the ratio of the projection area to the area of the first opening. In this case, a ratio of 85% or more is preferable in that the irregularity of the inner wall of the through hole 12a, which causes damping of the energy of acoustic waves travelling in the through hole 12a, can be reduced and the energy conversion efficiency between acoustic waves and heat in the thermoacoustic energy converting element part 12 can be improved. The projection area is preferably 90% or more of the area of the first opening, more preferably, 95% or more.

A plurality of plates, having main surfaces parallel to the extending direction of the through holes 12a, constituting the thermoacoustic energy converting element part 12 may be metal plates. The material of the metal plates may be, but not limited to, stainless steel, carbon steel, pure iron, aluminum, titanium, nickel, chromium, alloys of aforementioned materials, or alloys of the materials including cobalt or manganese. When metal plates are used, it is preferable to provide the plates with bonded surfaces formed by thermocompression bonding.

A plurality of plates constituting the thermoacoustic energy converting element part 12 are preferably metal plates of a same type so that the thermal conductivity can be provided uniform along the direction perpendicular to the extending direction of the through holes 12a to generate a stable thermal gradient along the extending direction.

In addition to metal plates, the plates constituting the thermoacoustic energy converting element part 12 may be the plates formed of a sintering material having pores. Alternatively, the plates may be glass plates. The material of the plates is not particularly limited.

The through holes 12a, in which acoustic waves travel, of the thermoacoustic energy converting element part 12 and the thermoacoustic energy converting element part 112 according to the embodiment, preferably include the through holes 12a that have a hydraulic diameter of 0.4 mm or smaller to provide high energy conversion efficiency between acoustic waves and heat. The number of through holes 12a having a hydraulic diameter of 0.4 mm or smaller is preferably 80% or more of the total number of through holes 12a, in which acoustic waves travel, in the thermoacoustic energy converting element part 12 and the thermoacoustic energy converting element part 112. Most preferably, every through hole 12a, in which acoustic waves travel, in the thermoacoustic energy converting element part 12 and the thermoacoustic energy converting element part 112 has a hydraulic diameter of 0.4 mm or smaller.

The hydraulic diameter of the through holes 12a is preferably 0.4 mm or smaller because the maximum thickness of the layer in the fluid that contributes to energy conversion between the walls surrounding the through holes 12a and the fluid is 0.2 mm. To improve energy conversion efficiency, the hydraulic diameter of the through hole 12a is preferably 0.4 mm or smaller. The hydraulic diameter is a dimension related to a cross section of the through hole 12a taken perpendicular to the extending direction thereof and is expressed by $4 \cdot S/L$ mm, where L mm is the outer peripheral length of the cross section and S mm$^2$ is the area of the cross section. The preferable hydraulic diameter of the through hole 12a is 0.2 to 0.3 mm. The hydraulic diameter of the through hole 12a smaller than 0.1 mm is not preferable because the frictional resistance between the fluid and the wall of the through hole 12a is high. The hydraulic diameter of the through hole 12a is preferably 0.1 mm or larger.

The thermal conductivity of the structure along the extending direction of the through holes 12a in the thermoacoustic energy converting element part 12 and the thermoacoustic energy converting element part 112 is preferably low, for example, below 10 W/m/K so as not to deteriorate the energy conversion efficiency.

The thermal conductivity can be calculated by the temperature gradient method (the steady-state method) as described below. A TEST sample for measuring the thermal conductivity is sandwiched between spacers whose thermal conductivity is known. One of end faces of the sandwiching spacers is heated to 30 to 200° C. while the other end face is cooled to 20 to 25° C. to generate a steady temperature gradient along the thickness direction of the TEST sample. The heat flow is calculated from the temperature gradient in the spacer. The heat flow is divided by the temperature difference to obtain the thermal conductivity. More specifically, the thermoacoustic energy converting element part 12 or the thermoacoustic energy converting element part 112 having a diameter of 30 mm and a thickness of 30 mm is used as a TEST sample and a spacer having a diameter of 30 mm and a length of 150 mm made of stainless steel or copper is used. The temperature distribution in the spacer along the axial direction is measured to obtain the thermal conductivity along the extending direction of the through hole. Through this method, the thermal conductivity of the structure is measured.

The open area ratio of the plurality of through holes 12a in the thermoacoustic energy converting element part 12 and the thermoacoustic energy converting element part 112 is preferably 60% or more, which gives high energy conversion efficiency between acoustic waves and heat. By providing an open ratio of through holes of 60% or more to the thermoacoustic energy converting element part 12 and the thermoacoustic energy converting element part 112, the energy conversion between the fluid in which the acoustic waves travel and the wall takes place at further larger number of locations, and thereby the contact area between the fluid and the wall 12b can be increased. The open area ratio is the ratio of the total cross sectional area of the through holes to the area inside the outer periphery of the cross section of the thermoacoustic energy converting element part 12 and the thermoacoustic energy converting element part 112 taken perpendicular to the X direction. If the open area ratio is lower than 60%, the area of the travelling route in the thermoacoustic energy converting element part 12 and the thermoacoustic energy converting element part 112 steeply decreases, which may result in increase in dissipation of acoustic wave energy caused by viscosity of the fluid element. For this reason, the open area ratio is preferably 70% or more, more preferably, 80% or more. The upper limit of the open area ratio is, for example, 93%. The open area ratio is calculated by the expression S2/(S1+S2), where S1 is an area of material portion and S2 is an area of opened portion. S1 and S2 are obtained from a photographic image of the cross section (polished surface) perpendicular to the through hole taken with a microscope.

The density (cell density) of the through holes 12a is preferably within a range from 1600 cpsi (the number of through holes within one square inches [number of cells]) to 9000 cpsi. By increasing the density of through holes, the fluid loss occurring between the fluid and the thermoacoustic energy converting element part 12 can be suppressed.

The heat capacity of the material of the wall 12b at 400° C. in the thermoacoustic energy converting element part 12 and the thermoacoustic energy converting element part 112 is preferably 3 J/cc/K (the heat capacity of a portion of the wall 12b with a volume of 1 cc) or more. Thus, the change in temperature of the wall due to the heat exchange between the wall and the fluid is reduced, and thereby the temperature gradient can be kept stable. If the heat capacity of the material of the wall 12b is below 3 J/cc/K, the temperature of the wall steeply decreases or increases by the heat exchange between the wall 12b and the fluid. Therefore, the heat capacity below 3 J/cc/K is not preferable to stably keep the temperature gradient. The upper limit of the heat capacity is, for example, 6 J/cc/K.

Specifically, the heat capacity of the material of the wall 12b at 400° C. in the thermoacoustic energy converting element part 12 and the thermoacoustic energy converting element part 112 can be calculated from the relation between the input calorie and the temperature rise, which are measured with an adiabatic calorimeter for a powdered or fragmented sample provided by cutting out and crushing a portion of the material.

The thermal expansion along the extending direction of the through holes of the thermoacoustic energy converting element part 12 and the thermoacoustic energy converting element part 112 under the temperature from 20 to 800° C. is preferably 6 ppm/K or smaller. Thereby, the thermal stress in the thermoacoustic energy converting element part 12 and the thermoacoustic energy converting element part 112 can thus be reduced, which prevents damage caused by thermal strain. The thermal expansion along the extending direction of the through hole of the thermoacoustic energy converting element part 12 and the thermoacoustic energy converting element part 112 under the temperature from 20 to 800° C. is further preferably 3 ppm/K or smaller. The lower limit of the thermal expansion is, for example, 1 ppm/K. In a case where the thermoacoustic energy converting element part 12 and the thermoacoustic energy converting element part 112 are composed of a ceramic, the thermal expansion along the extending direction of the through holes 12a is measured according to JIS R1618-2002 "Measuring method of thermal expansion of fine ceramics by thermomechanical analysis". In a case where the thermoacoustic energy converting element part 12 and the thermoacoustic energy converting element part 112 are composed of a metal, the thermal expansion along the extending direction of the through holes 12a is measured according to JIS Z2285.

In the embodiment, to prevent heat from dissipating inside from the surface of the wall 12b, a ceramic coating layer is preferably provided on the inner walls surrounding the through holes 12a. The thickness of the ceramic coating layer is preferably, for example, 5 μm to 100 μm. By providing the ceramic coating layer, the thermal conductivity along the direction perpendicular to the extending direction of the through hole 12a can be reduced by, for example, 30% or more, further preferably, 40% or more. For example, the thermal conductivity of the wall 12b made of austenitic stainless steel is about 16 W/m/K, whereas the thermal conductivity of the structure having the open area ratio of 80% is 3.2 W/m/K. When the ceramic coating layer of cordierite is coated with the thickness of 10 μm on the surface of the wall 12b, the thermal conductivity of the structure along the direction perpendicular to the extending direction of the through hole 12a can be 2 W/m/K or lower.

The cross sectional shape of the through hole provided in the thermoacoustic energy converting element part 12 and the thermoacoustic energy converting element part 112 is, for example, a polygonal shape such as a triangle, a square, and a hexagon. The cross sectional shape may be a combined shape of such polygonal shapes. On the inner surface of the wall 12b facing the through hole 12a, a rib 12c (refer to FIG. 8) may be provided along the extending direction of the through hole 12a to protrude inside the through hole 12a. With the rib 12c provided on the inner surface of the wall 12b, the contact area between the fluid in which acoustic waves travel and the wall 12b increases. The efficiency of conversion between sound pressure energy and thermal energy can thus be improved.

Method of Manufacturing Thermoacoustic Energy Converting Element Part

Figure 5:
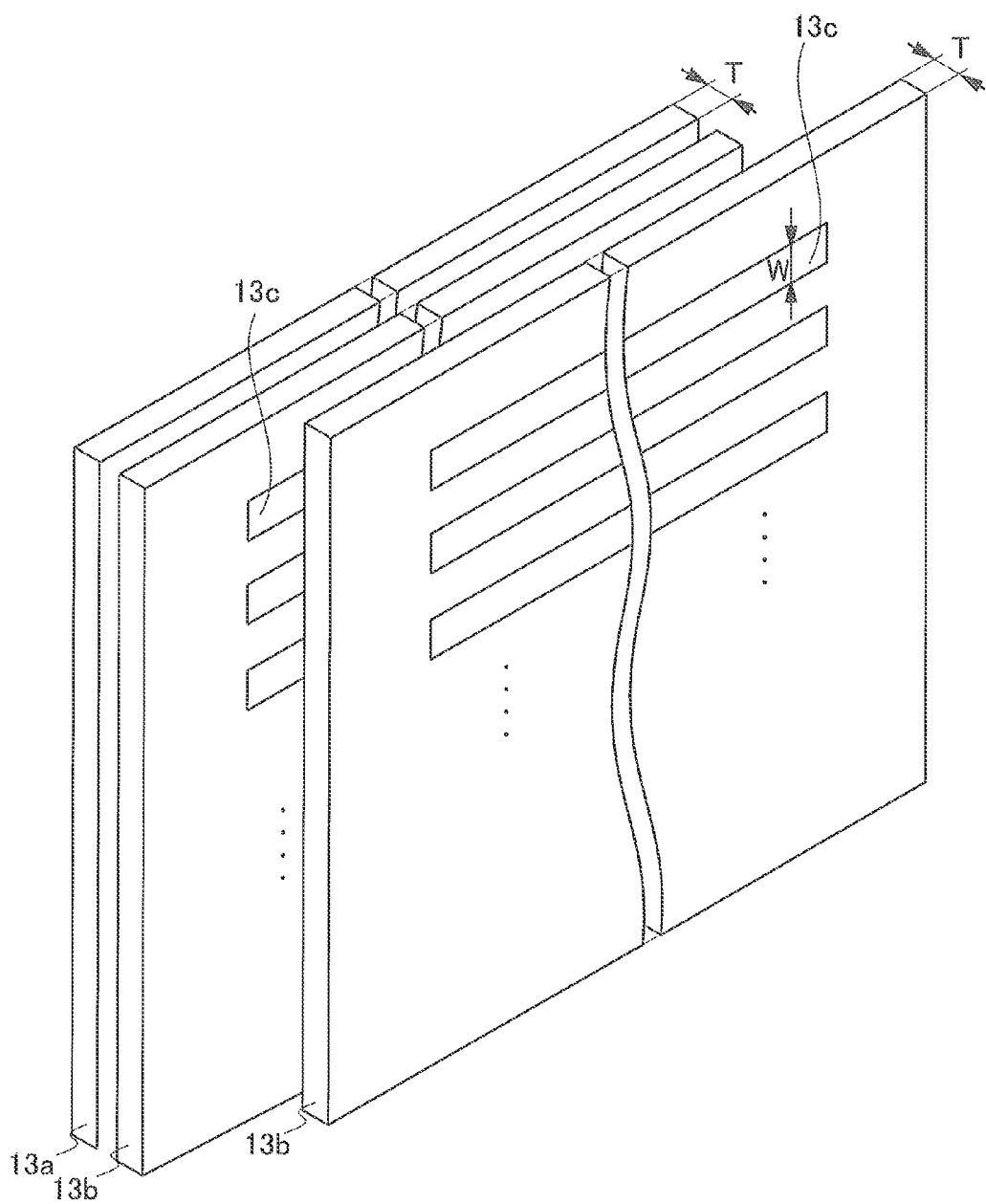
FIG. 5 illustrates a method of manufacturing a thermoacoustic energy converting element part according to the embodiment.
Figure 6:
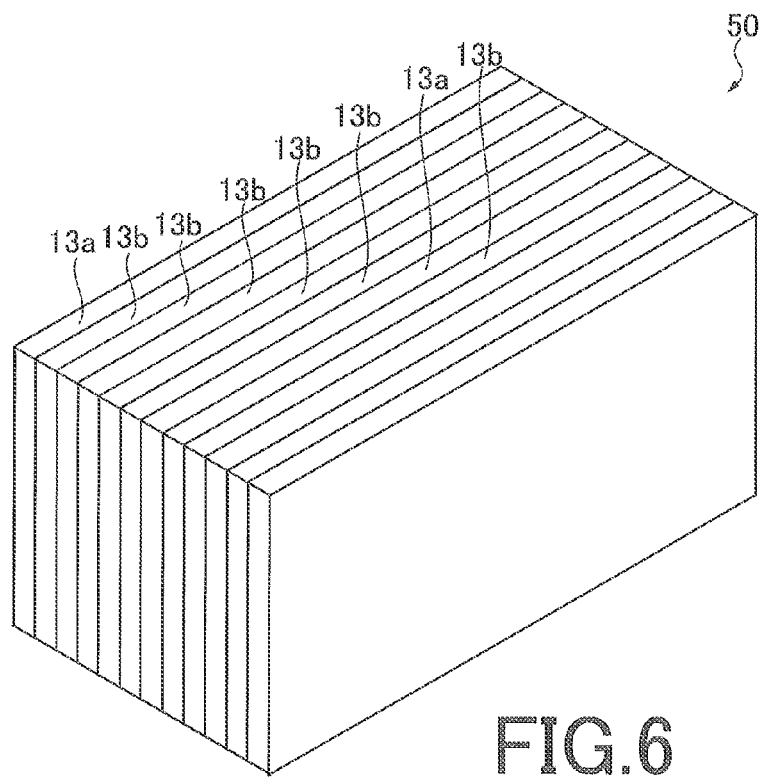
FIG. 6 illustrates a plate assembly formed by the method of manufacturing a thermoacoustic energy converting element part.
Figure 7:
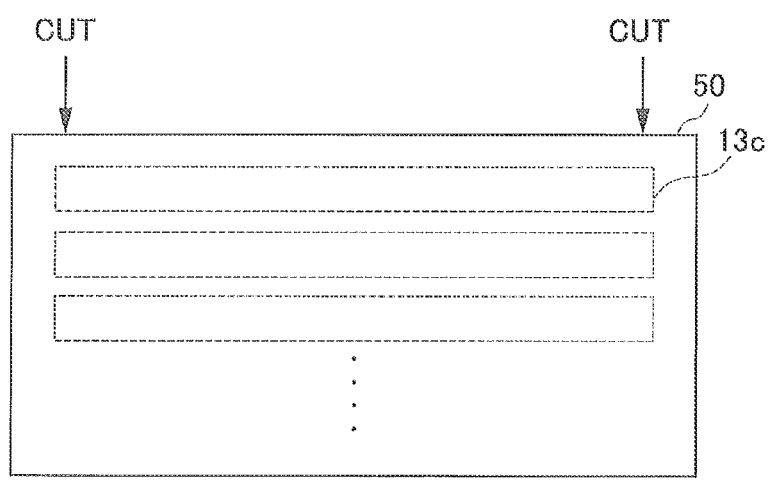
FIG. 7 illustrates the plate assembly cut in the method of manufacturing a thermoacoustic energy converting element part according to the embodiment.

A method of manufacturing a thermoacoustic energy converting element parts 12 and 112 will be described below. FIG. 5 illustrates a method of manufacturing thermoacoustic energy converting element parts 12 and 112. FIG. 6 illustrates a plate assembly 50 used for manufacturing the embodiment. FIG. 7 illustrates the plate assembly 50 being cut when manufacturing the embodiment.

First, a plurality of first plates 13b and a plurality of second plates 13a are prepared. The first plate 13b is provided with a plurality of penetration slits 13c. The penetration slits penetrate the plate in the thickness direction, extend straight in a direction, and are provided at intervals in the direction perpendicular to the extending direction of the slits 13c. At both ends, the penetration slit 13c is enclosed within both rims of the first plate 13b. The penetration slits 13c are provided parallel to each other in the first plate 13b.

The second plate 13a is not provided with any penetration slit 13c.

The first plate 13b and the second plate 13a have, for example, rectangular main surfaces of the identical shape and dimensions. As illustrated in FIG. 5, the thickness T is, for example, 0.02 to 0.2 mm and the width W is, for example, 0.15 to 0.4 mm where T is the plate thickness and W is the width of the penetration slit 13c. As for the process of forming a communicating passage with a bundle of a plurality of penetration slits 13c, the penetration slits 13c provided in the first plate 13b may be separated by any distance. For example, when the through hole 12a with a rectangular cross section is formed, the penetration slits 13c may be provided separately from each other by a certain distance. As for the through hole 12a having a rectangular cross section, the distance between the penetration slits 13c in any first plate 13b to be layered has an identical. The penetration slit 13c can be formed through a processing of, for example, etching. For example, a plate having a thickness of 0.2 mm or smaller is cleaned before processing, and then a photoresist film is attached on each of both the main surfaces of the plate. An original board made of a film or glass having processing patterns to reproduce openings corresponding to the penetration slits 13c and a pin hole for a locating pin is closely attached to the photoresist film on the main surface of the plate. Through exposure and development, a mask is formed on the plate. An etching liquid is sprayed on the main surface of the masked plate to perform etching. The mask is then removed and the plate 13b having penetration slits 13c and the pin hole is obtained.

Between adjacent two second plates 13a, some of the first plates 13b are layered, when a plurality of the second plates 13a are aligned such that the main surfaces of the second plates 13a face each other. The layered first plates 13b constitute an assembly of plates 50 (see FIG. 6) provided with communicating passages formed with penetration slits 13c adjoining in the layering direction in the layered first plates 13b. The main surface of the second plate 13a has the largest area among a plurality of surfaces constituting the second plate 13a. The first plates 13b and the second plates 13a are layered in the order of, a second plate 13a, a plurality of first plates 13b, a second plate 13a, and a plurality of first plates 13b. The number of second plates 13a held between a plurality of first plates 13b may be one or more.

When layered, the first plates 13b are positioned so that the penetration slits 13c adjoin each other in the layering direction to form communicating passages. With this positioning, a plurality of penetration slits 13c continuously adjoin each other to form a communicating passage. In the embodiment as described above, when layering the first plates 13b, how to arrange penetration slits 13c to adjoin each other is not limited as long as portions of the penetration slits 13c in the first plate 13b overlap with each other. Preferably, for example, first plates 13b are layered so as to align penetration slits 13c with no step therebetween throughout the communicating passage. Specifically, the embodiment may be such that the shape of penetration slits 13c is identical and the penetration slits 13c that align to form a communicating passage are identically positioned in every first plate 13b to be layered, thereby aligning the penetration slits 13c in first plates 13b with no step therebetween.

When layered, a plurality of first plates 13b are positioned, for example, by fitting a pin in a pin hole (not shown) provided in the first plate 13b to arrange the penetration slits 13c to adjoin each other in the layering direction, or to align the penetration slits 13c at an identical position. The assembly 50 is thus formed.

When the plates made of metal are used for the assembly 50, for example, the adjoining plates are bonded by thermocompression bonding. When the plates are made of a sintering material, such as ceramics, or glass, the plates can be bonded by using adhesives, baking method of inorganic material using ceramic precursors, brazing or compression bonding using metal material between the plates, solid phase bonding by hot pressing, or mechanical joining such as tightening with bolts and clamping.

Thermocompression bonding of metal plates is performed, for example, under hydrogen atmosphere in a furnace at a certain temperature. For example, when the metal plate is made of stainless steel, such as austenitic stainless steel, the temperature of the metal plate is preferably held at 1050 to 1150° C. When bonding metal plates, for example, the metal plates are held under, for example, 1100° C. for 15 minutes under a pressure of, for example, 300 to 2000 atmospheres.

After forming the plate assembly 50, as illustrated in FIG. 7, the portions of the assembly 50 at both ends in the extending direction of the penetration slit 13c are cut off, and thereby forming the communicating passages formed with penetration slits 13c open to both cutaway surfaces on both sides, in the extending direction of the penetration slit 13c, of the assembly 50. In this manner, the thermoacoustic energy converting element parts 12 and 112 provided with a plurality of through holes 12a provided so as to penetrate along the extending direction (X direction) and walls 12b formed to surround the through holes 12a to extend along the extending direction of the through holes 12a are manufactured. To manufacture thermoacoustic energy converting element parts 12 and 112 having a cylindrical shape, the outer peripheral portion of the thermoacoustic energy converting element parts 12 and 112 may be cut or grinded.

When manufacturing the thermoacoustic energy converting element parts 12 and 112, the first plate 13b and the second plate 13a are preferably made of a same metal material so as to make the manufacturing of the element parts easy and to provide uniform thermal expansion.

To improve the energy conversion efficiency between acoustic waves and heat, it is preferable that the hydraulic diameter of the cross section of the through hole 12a be 0.4 μm or smaller, that is, the width W, which is the dimension along the width direction perpendicular to the extending direction of the penetration slit 13c is preferably 0.4 m or smaller and the dimension of the communicating passage, formed by layering the first plates 13b, along the layering direction of the first plates 13b is preferably 0.4 m or smaller. For example, to provide the hydraulic diameter of 0.2 mm, the thickness T of the first plate 13b and the second plate 13a is set to 0.04 mm, the width W of the penetration slit 13c is set to 0.2 mm, and five layers of the first plate 13b is provided between two of the second plates 13a, thereby forming a hole having a rectangular cross section of 0.2 mm by 0.2 mm.

Furthermore, a ceramic coating layer is preferably provided on the inner wall of the through hole 12a of the thermoacoustic energy converting element part 12 and the thermoacoustic energy converting element part 112 manufactured by cutting off both ends of the assembly 50. For example, the thickness of the ceramic coating layer is preferably 5 μm to 100 μm. By providing the ceramic coating layer, the thermal conductivity along the direction perpendicular to the extending direction of the through hole 12a can be reduced by, for example, 30% or more, further preferably, 40% or more.

As described above, in the manufacturing method of the embodiment, the assembly 50 is formed from a plurality of first plates 13b each having a large number of penetration slits 13c to manufacture the thermoacoustic energy converting element parts 12 and 112. Thus, the straightness of the inner wall of the through hole 12a along the extending direction, that is the straightness of the through hole 12a, depends on the straightness of the penetration slit 13c along the extending direction. The penetration slits 13c extending straight can easily be made by etching with masking. Thus, the inner wall of the through hole 12a is free from irregularity which exists in a conventional through holes along the extending direction. Thus the straightness of the inner wall of the through holes 12a is improved. In the thermoacoustic energy converting element parts 12 and 112 manufactured in this method, the damping of sound pressure energy of acoustic waves is minimized, and thus the energy conversion efficiency between acoustic waves and heat can be improved.

Figure 8:
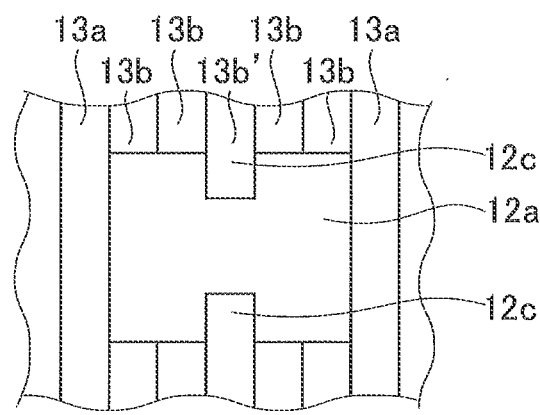
FIG. 8 illustrates a cross section of a through hole in the thermoacoustic energy converting element part manufactured by the method of manufacturing a thermoacoustic energy converting element part according to the embodiment.

Beside improving the straightness of through hole 12a, the contact area between the fluid and the wall 12b is preferably broadened to increase the amount of energy converted between acoustic waves and heat. A protrusion is preferably provided, which protrudes inward from the wall 12b in a cross sectional view of the through hole 12a, to increase the contact area between the fluid and the wall 12b. FIG. 8 illustrates a cross section of the through hole 12a in the thermoacoustic energy converting element parts 12 and 112. As illustrated in FIG. 8, the inner wall of the through hole 12a may be provided with a rib 12c that extends along the extending direction of the through hole 12a and protrudes inward in a cross sectional view of the through hole 12a. As illustrated in FIG. 8, the rib 12c may preferably be provided by using a first plate 13b' which has a smaller width W of the penetration slit 13c than the width W of the penetration slit 13c of the other first plates 13b.

Exemplary Experiment

Various types of thermoacoustic energy converting element parts are manufactured to investigate energy conversion between the fluid and the wall in the thermoacoustic energy converting element part according to the embodiment.

To calculate the efficiency of energy conversion, acoustic waves are converted into electric power in a linear power generator at the output end 14a of the thermoacoustic energy converter 10 illustrated in FIG. 1, and the generated power W J/sec is measured. Meanwhile, an input calorie Q J/sec at a high temperature side heat exchanging unit that is transferred to the system is calculated by the equation of $Q=\Delta T \cdot Cp \cdot M$, where $\Delta T$ is the temperature difference of the gas between the input port and the output port of the high temperature side heat exchanging unit, M kg/sec is the flow rate of the gas, and Cp J/kg/K is a specific heat of the gas. The conversion efficiency η is calculated by the equation of $\eta=W/Q$. The efficiency of 20% or higher is required to pass the TEST.

The thermoacoustic energy converting element part has a length of 30 mm in X direction. Helium gas is hermetically contained in the guide tube 14 and kept at 10 atmospheres. The low temperature portion 15 and the high temperature portion 23 of the thermoacoustic energy converting element part are set to each temperature so as the end of the low temperature portion 15 to be 60° C. and the end of the high temperature portion 23 to be 500° C., respectively.

TABLE 1 shows energy conversion efficiency for each configuration.

Conventional Example is a cylindrical thermoacoustic energy converting element part manufactured by bonding metal mesh plates (having a thickness of 0.02 mm) made of stainless steel layered along X direction. In Conventional Example, the plates are layered along the extending direction of through holes.

For Working Examples 1 to 4, the thermoacoustic energy converting element part 12 illustrated in FIG. 3 is manufactured by the method illustrated in FIGS. 5 to 7 using first plates 13b provided with penetration slits 13c and second plates 13a, where the first plates 13b and the second plates 13a are made of the same metal as the metal mesh plate. In Working Examples 1 to 4, the plates (the first plates 13b and the second plates 13a) are layered along the direction perpendicular to the extending direction of the penetration slit 13c.

The thickness T of the first plate 13b and the second plate 13a of Working Examples 1, 2, and 4 is 0.04 mm. The thickness T of the first plate 13b and the second plate 13a of Working Example 3 is 0.05 mm.

For Conventional Example and Working Examples 1 to 4, the through holes have rectangular cross sections, the open area ratio of through holes is 80%, and the density of through holes (cell density) is 8000 cpsi. For thermoacoustic energy converting element parts of Conventional Example and Working Examples 1 to 3, a ceramic coating layer of cordierite is coated with the thickness of 10 μm on the inner wall of the through holes. No ceramic coating layer is formed in Working Example 4.

In Working Examples 1 and 4, through holes have a rectangular cross section of 0.2 mm by 0.2 mm (hydraulic diameter of 0.2 mm).

In Working Example 2, through holes have a rectangular cross section of 0.4 mm by 0.4 mm (hydraulic diameter of 0.4 mm).

In Working Example 3, through holes have a rectangular cross section of 0.45 mm by 0.45 mm (hydraulic diameter of 0.45 mm), and first plates 13b and second plates 13a have a thickness of 0.05 mm.

TABLE 1

|  | Layering Direction of Plates | Hydraulic Diameter mm | Thermal Conductivity of Plate W/m/K | Conversion Efficiency % |
|---|---|---|---|---|
| Conventional Example | Extending Direction of Through Hole | 0.2 | 16 | 18 |
| Working Example 1 | Direction Perpendicular to Extending Direction of Through Hole | 0.2 | 16 | 24 |
| Working Example 2 | Direction Perpendicular to Extending Direction of Through Hole | 0.4 | 16 | 22 |
| Working Example 3 | Direction Perpendicular to Extending Direction of Through Hole | 0.45 | 16 | 21 |
| Working Example 4 No Ceramic Coating Layer | Direction Perpendicular to Extending Direction of Through Hole | 0.2 | 16 | 23 |

Comparing the result of Conventional Example and Working Example 1 indicated in TABLE 1, the conversion efficiency differs depending on different layering direction of plates. In the Working Example 1, when a parallel light (laser beam) is emitted into one of openings at both ends of the through hole toward the other opening, the projection area of the parallel light passing out from the other opening is 90% of the area of the first opening. In contrast, in Conventional Example, the projection area of the parallel light passing out from the other opening is 75% of the area of the first opening. This indicates that the degree of straightness of the through hole of the Working Example 1 is higher than that of Conventional Example, which means that the damping of sound pressure energy of acoustic waves caused by friction against the wall is minimized.

Furthermore, by comparing Working Examples 1 to 3, it can be understood that the preferable hydraulic diameter of the through hole to improve the conversion efficiency is 0.4 mm or smaller.

The conversion efficiency of Working Example 4, which has no ceramic coating layer, is high and acceptable.

The method of manufacturing a thermoacoustic energy converting element part, the thermoacoustic energy converting element part, and the thermoacoustic energy converter according to the embodiment of the present invention are described above in detail. The present invention is not limited by the embodiments and working examples described above. Various modifications and alterations can be made without departing from the spirit and the scope of the present invention.

REFERENCE NUMERALS LIST 10 thermoacoustic energy converter
12, 112 thermoacoustic energy converting element part
12a through hole
12b wall
12c rib
13a second plate
13b first plate
13c penetration slit
14, 114 guide tube
14a output end
15 heat exchanging unit (low temperature part)
16, 24, 116, 124 supply tube
18, 26, 118, 126 ejection tube
20, 28, 120, 128 annular tube
21, 29, 121, 129 metal member
22, 122 cooling fin
23 heat exchanging unit (high temperature part)
30 heating fin
32, 132 insulation member
34, 134 casing
36, 136 circulation path
40 converting unit
50 assembly
115 heat output unit
123 heat exchanging unit
130 fin

What is claimed is:

1. A method of manufacturing a thermoacoustic energy converting element part configured to convert acoustic energy into thermal energy or thermal energy into acoustic energy between a fluid in which acoustic waves travel and a wall in contact with the fluid, the method comprising:
    forming a plurality of first plates and a plurality of second plates, each of the plates having a planar main surface with a largest area among a plurality of planar surfaces thereof, the first plate being provided with a plurality of linear penetration slits penetrating the first plate in a thickness direction, the slits being provided in parallel with each other and at intervals in a direction perpendicular to an extending direction of the slit, the second plate being not provided with penetration slit;
    forming a plate assembly by layering some of the plurality of first plates between adjacent two of the plurality of second plates of which the main surfaces face each other, the main surfaces of the first plates and the second plates being oriented substantially parallel to one another, the plate assembly provided with a plurality of communicating passages therein, each of which is formed with the penetration slits adjoining each other in a layering direction; and
    cutting off portions of the assembly, after forming the assembly, at both ends in the extending direction of the penetration slits to open the communicating passages to cutaway surfaces on both sides of the assembly, for manufacturing a thermoacoustic energy converting element part provided with a plurality of through holes and walls surrounding the through holes and extending along the extending direction of the through holes.

2. The method of manufacturing a thermoacoustic energy converting element part according to claim 1, wherein the first plates and the second plates are metal plates, and the first plates and the second plates are bonded by thermocompression bonding.

3. The method of manufacturing a thermoacoustic energy converting element part according to claim 1, wherein the first plates and the second plates are metal plates made of an identical material.

4. The method of manufacturing a thermoacoustic energy converting element part according to claim 1, wherein a width of each penetration slit along a direction perpendicular to the extending direction of the penetration slits is 0.4 µm or smaller.

5. The method of manufacturing a thermoacoustic energy converting element part according to claim 1, wherein a dimension of the communicating passage along the layering direction of the first plates is 0.4 µm or smaller.

6. The method of manufacturing a thermoacoustic energy converting element part according to claim 1, further comprising forming a ceramic coating layer on an inner wall of the through hole.

7. The method of manufacturing a thermoacoustic energy converting element part according to claim 1, wherein the plate assembly has cavities formed of the penetration slits inside the assembly.

8. A thermoacoustic energy converting element part that converts acoustic energy into thermal energy or thermal energy into acoustic energy between a fluid in which acoustic waves travel and a wall in contact with the fluid,
the thermoacoustic energy converting element part comprising a wall extendingly surrounding each of the plurality of through holes provided as travelling routes of acoustic waves in a body of the thermoacoustic energy converting element part, the through holes linearly extending in a direction and the wall extending along an extending direction of the through holes, wherein
the thermoacoustic energy converting element part is composed of a layered structure of a plurality of plates, each of the plates having a planar main surface parallel to an extending direction of the through holes, the main surface having a largest area among a plurality of planar surfaces thereof, the main surface of each of the plates being in contact with the main surface of an adjacent plate.

9. The thermoacoustic energy converting element part according to claim 8, wherein, when a parallel light is emitted into a first opening toward a second opening, a projection area of a parallel light passing out from the second opening is 85% or more of the area of the first opening, the first opening and the second opening being located at both ends of each through hole.

10. The thermoacoustic energy converting element part according to claim 8, wherein the through holes include a through hole having a hydraulic diameter of 0.4 mm or smaller.

11. The thermoacoustic energy converting element part according to claim 8, wherein the plates include a bonded surface formed by thermocompression bonding of plates.

12. The thermoacoustic energy converting element part according to claim 8, wherein the plurality of plates are metal plates of an identical type of metal.

13. The thermoacoustic energy converting element part according to claim 8, wherein a ceramic coating layer is provided on an inner wall of the through hole.

14. The thermoacoustic energy converting element part according to claim 8, wherein each of the through holes has only two openings on both sides of the extending direction and is surrounded over a whole periphery by surfaces of the layered plates in a region between the two openings.

15. A thermoacoustic energy converter configured to amplify acoustic wave energy in fluid using heat of a wall in contact with the fluid, the thermoacoustic energy converter comprising:
a thermoacoustic energy converting element part that is configured to convert thermal energy into acoustic wave energy between a fluid in which acoustic waves travel and a wall in contact with the fluid, the thermoacoustic energy converting element part comprising a wall extendingly surrounding each of a plurality of through holes provided as travelling routes of acoustic waves in a body of the thermoacoustic energy converting element part, the through holes linearly extending in a direction and the wall extending along an extending direction of the through holes, and the thermoacoustic energy converting element part being composed of a layered structure of a plurality of plates each having a planar main surface parallel to the extending direction of the through holes, the main surface having a largest, area among a plurality of planar surfaces thereof, the main surface of each of the plates being in contact with the main surface of an adjacent plate;
a guide tube forming a travelling route of acoustic waves travelling in the fluid and configured to guide the acoustic waves to the through holes so as the acoustic waves travel along the extending direction of the through hole in the thermoacoustic energy converting element part; and
a pair of heat exchanging units provided on both ends of the thermoacoustic energy converting element part and configured to generate temperature gradient along the extending direction between both ends of the thermoacoustic energy converting element part, wherein
the guide tube includes an output end which is configured to output acoustic waves having sound pressure energy amplified by using the temperature gradient and to be coupled to a converter configured to convert the amplified sound pressure energy of output acoustic waves into other form of energy.

16. The thermoacoustic energy converter according to claim 15, the thermoacoustic energy converter comprising a wall extendingly surrounding each of a plurality of through holes provided as travelling routes of acoustic waves in a body of the thermoacoustic energy converter, the through holes linearly extending in a direction and the wall extending along an extending direction of the through holes, wherein
the thermoacoustic energy converter is composed of a layered structure of a plurality of plates, each of the plates having a main surface parallel to the extending direction of the through holes, and wherein
when a parallel light is emitted from a first opening toward a second opening, a projection area of the parallel light passing out from the second opening is 85% or more of the area of the first opening, the first opening and the second opening being located at opposite ends of each hole.

17. The thermoacoustic energy converter according to claim 15, wherein each of the through holes has only two openings on both sides of the extending direction and is surrounded over a whole periphery by surfaces of the layered plates in a region between the two openings.

18. A thermoacoustic energy converter including a thermoacoustic energy converting element part configured to generate temperature gradient of a wall, using acoustic wave energy in a fluid, the wall being in contact with the fluid, the thermoacoustic energy converter comprising:

the thermoacoustic energy converting element part configured to convert acoustic wave energy into thermal energy between a fluid in which acoustic waves travel and a wall in contact with the fluid, the thermoacoustic energy converting element part comprising a wall extendingly surrounding each of a plurality of through holes provided as travelling routes of acoustic waves in a body of the thermoacoustic energy converting element part, the through holes linearly extending in a direction and the wall extending along an extending direction of the through holes, and the thermoacoustic energy converting element part being composed of a layered structure of a plurality of plates each having a planar main surface parallel to the extending direction of the through hole, the main surface having a largest area among a plurality of planar surfaces thereof, the main surface of each of the plates being in contact with the main surface of an adjacent plate;

a guide tube forming a travelling route of acoustic waves travelling in the fluid and configured to guide the acoustic waves to the through holes so as the acoustic waves travel along the extending direction of the through holes in the thermoacoustic energy converting element part;

a heat exchanging unit provided on one of ends of the thermoacoustic energy converting element part and kept at a constant temperature; and a heat output unit provided on the other end of the thermoacoustic energy converting element part and configured to provide, by using a temperature gradient generated in the thermoacoustic energy converting element part by travelling of the acoustic waves, a temperature different from the temperature of the heat exchanging unit.

19. The thermoacoustic energy converter according to claim 18, the thermoacoustic energy converter comprising a wall extendingly surrounding each of a plurality of through holes provided as travelling routes of acoustic waves in a body of the thermoacoustic energy converter, the through holes linearly extending in a direction and the wall extending along an extending direction of the through holes, wherein the thermoacoustic energy converter is composed of a layered structure of a plurality of plates, each of the plates having a main surface parallel to the extending direction of the through holes, and wherein when a parallel light is emitted from a first opening toward a second opening, a projection area of the parallel light passing out from the second opening is 85% or more of the area of the first opening, the first opening and the second opening being located at opposite ends of each hole.

20. The thermoacoustic energy converter according to claim 18, wherein each of the through holes has only two openings on both sides of the extending direction and is surrounded over a whole periphery by surfaces of the layered plates in a region between the two openings.

* * * * *